(12) United States Patent
Momen et al.

(10) Patent No.: US 11,942,822 B2
(45) Date of Patent: Mar. 26, 2024

(54) STATOR TOOTH AND WINDING CONDUCTOR DESIGNS FOR ELECTRIC MACHINES

(71) Applicant: GM GLOBAL TECHNOLOGY OPERATIONS LLC, Detroit, MI (US)

(72) Inventors: Mohammad F. Momen, Rochester Hills, MI (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 17/560,404

(22) Filed: Dec. 23, 2021

(65) Prior Publication Data

US 2023/0208216 A1 Jun. 29, 2023

(51) Int. Cl.
| | |
|---|---|
| *H02K 1/16* | (2006.01) |
| *B60K 1/00* | (2006.01) |
| *H02K 1/276* | (2022.01) |
| *H02K 7/00* | (2006.01) |
| *H02K 21/14* | (2006.01) |

(52) U.S. Cl.
CPC ............... *H02K 1/165* (2013.01); *B60K 1/00* (2013.01); *H02K 1/276* (2013.01); *H02K 7/006* (2013.01); *H02K 21/14* (2013.01); *H02K 2201/03* (2013.01)

(58) Field of Classification Search
CPC ........ H02K 7/006; H02K 21/14; H02K 1/165; H02K 3/12; H02K 1/276; H02K 2201/03; H02K 2213/03; B60K 1/00

USPC .................................................. 310/156.56
See application file for complete search history.

(56) References Cited

U.S. PATENT DOCUMENTS

| | | | |
|---|---|---|---|
| 2,990,508 A | 6/1961 | Thompson | |
| 5,166,568 A | 11/1992 | Nystuen et al. | |
| 6,163,127 A | 12/2000 | Patel et al. | |
| 6,674,205 B2 | 1/2004 | Biais et al. | |
| 7,348,705 B2 * | 3/2008 | Cai | B60L 15/2009 310/201 |
| 7,737,598 B2 * | 6/2010 | Ionel | H02K 3/28 310/216.058 |
| 7,969,058 B2 | 6/2011 | Rahman et al. | |
| 8,120,223 B2 | 2/2012 | Leonardi et al. | |
| 8,138,651 B2 | 3/2012 | Rahman et al. | |
| 8,174,158 B2 | 5/2012 | Rahman et al. | |

(Continued)

*Primary Examiner* — Alex W Mok
(74) *Attorney, Agent, or Firm* — Quinn IP Law

(57) ABSTRACT

Presented are electric machines with optimized stator tooth geometries and multi-gauge stator conductors, methods for making/using such electric machines, and motor vehicles equipped with such electric machines. An electric machine includes a housing, a rotor assembly rotatably attached to the housing, and a stator assembly coaxial with and separated by an airgap from the rotor assembly. The rotor assembly includes one or more magnets mounted to a rotor core. The stator assembly includes a stator core with multiple axially elongated, circumferentially spaced stator slots, multiple radially aligned stator teeth interleaved between and separating the slots, and multiple electromagnetic windings wound through the slots. Each stator tooth has an elongated tooth body with a tooth head at a radial end of a tooth root, which attaches to a cylindrical hub of the stator core. The tooth head has an axial cross-section with a trapezoidal crown integral with a rectangular tip.

20 Claims, 4 Drawing Sheets

(56) References Cited

U.S. PATENT DOCUMENTS

| | | | |
|---|---|---|---|
| 8,415,854 B2 * | 4/2013 | Saban | H02K 3/487 |
| | | | 310/216.016 |
| 8,860,278 B2 * | 10/2014 | Morgante | H02K 17/165 |
| | | | 310/201 |
| 8,928,197 B2 | 1/2015 | Jurkovic et al. | |
| 8,933,606 B2 | 1/2015 | Rahman et al. | |
| 9,035,522 B2 | 5/2015 | Liang et al. | |
| 9,712,005 B2 | 7/2017 | Rahman et al. | |
| 9,871,417 B2 * | 1/2018 | Saito | H02K 16/00 |
| 9,917,495 B2 * | 3/2018 | Laldin | H02K 21/14 |
| 10,056,794 B2 * | 8/2018 | Saito | H02K 3/16 |
| 10,340,756 B2 * | 7/2019 | Saito | H02K 3/28 |
| 2006/0017345 A1 | 1/2006 | Uchida et al. | |
| 2007/0018525 A1 * | 1/2007 | Cai | B60L 50/16 |
| | | | 310/201 |
| 2007/0216249 A1 | 9/2007 | Gruendel et al. | |
| 2007/0252447 A1 * | 11/2007 | Ionel | H02K 29/03 |
| | | | 310/44 |
| 2009/0045688 A1 | 2/2009 | Liang et al. | |
| 2010/0019589 A1 * | 1/2010 | Saban | H02K 5/1285 |
| | | | 310/216.069 |
| 2010/0244610 A1 | 9/2010 | Hao et al. | |
| 2011/0062902 A1 | 3/2011 | Patel et al. | |
| 2011/0109180 A1 | 5/2011 | Akutsu et al. | |
| 2011/0169363 A1 | 7/2011 | Summers et al. | |
| 2011/0198962 A1 | 8/2011 | Tang | |
| 2013/0147303 A1 | 6/2013 | Kaiser et al. | |
| 2013/0270952 A1 | 10/2013 | Jurkovic et al. | |
| 2014/0252903 A1 | 9/2014 | Rahman et al. | |
| 2017/0063187 A1 * | 3/2017 | Hao | H02K 21/14 |
| 2017/0302114 A1 * | 10/2017 | Chung | H02K 1/165 |
| 2018/0358876 A1 * | 12/2018 | Fatemi | H02K 1/16 |
| 2020/0195071 A1 | 6/2020 | Fatemi et al. | |
| 2020/0235621 A1 * | 7/2020 | Husain | H02K 1/16 |

\* cited by examiner

STATOR TOOTH AND WINDING CONDUCTOR DESIGNS FOR ELECTRIC MACHINES

The present disclosure relates generally to electric machines. More specifically, aspects of this disclosure relate to multiphase, alternating current permanent magnet motors with hairpin-wound stator architectures for reduced AC winding loss.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

There are three primary types of electric machines used for traction motors in modern electric-drive vehicle powertrains: brushless direct current (BLDC) permanent magnet (PM) motors, brushless asynchronous alternating current (AC) motors, and multiphase synchronous ACPM motors. Permanent magnet motors have a number of operating characteristics that make them more attractive for use in vehicle propulsion applications when compared to their available counterparts, including high efficiency, high torque, high power densities, and a long constant-power operating range. A traction motor is an electric machine that converts electrical energy into rotational mechanical energy using a stator with multiphase electromagnetic windings, such as electrically conductive "hairpin" bars, and a rotatable rotor that bears an engineered pattern of magnets, such as surface-mounted or interior-mounted permanent magnets. Permanent magnet motors may be categorized to DC or AC, rotary or linear, and radial flux or axial flux. In radial-flux PM motor designs, the magnet-bearing rotor may be coaxially nested inside the stator or may circumscribe the stator. Alternatively, a PM motor may take on an axial flux arrangement in which the stator and rotor are facing, coaxial disks. Rotation of the rotor is effected by a magnetic field that is produced by the flow of current through the stator windings and interacts with a magnetic field produced by the rotor-borne magnets.

A traditional stator assembly may be fabricated with a stator core that is formed from thin ferromagnetic discs that are stacked and laminated together into a cylindrical body. Each disc has several openings that, when aligned with the openings of neighboring discs, form stator slots that extend axially through the length of the stator core. Conductive elements, such as metallic rods, bars, wires, etc., are wound around the stator core and through these stator slots. A single stator slot may house several individual conductors, which are arranged adjacent one another in a radial direction with respect to the stator core in a manner that forms concentric rings of conductors. For radial-flux ACPM motors, the rotor may be circumscribed by the stator with the stator assembly spaced from the rotor assembly by an airgap. Partitioning the radially innermost ends of the stator slots are stator teeth that project towards the outer-diameter (OD) periphery of the rotor assembly. Stator teeth encourage the magnetic flux produced by the stator windings to pass directly across the airgap to the rotor and electromagnetically link with the magnets that are located inside slots of the rotor core before completing the flux path back to the stator assembly.

SUMMARY

Presented herein are electric machines with optimized stator tooth geometries and multi-gauge stator conductors, methods for making and methods for operating such electric machines, and motor vehicles equipped with brushless ACPM motors having modified tooth tip and inner conductor designs for reduced AC winding loss. By way of example, motor efficiency and maximum motor torque output is generally inhibited by excess AC winding losses caused by the stator windings' ohmic resistance to electrical current. Winding loss—also referred to anachronistically as "copper loss" (irrespective of conductor material)—results in the unwanted dissipation of electrical energy as heat, especially during high-speed motor operation. Motors may suffer additional losses due to the AC proximity effect causing the stator-borne conductors that are packaged closest to the airgap to be cut by rotor flux at high operating speeds. Presented herein are optimized stator slot and tooth geometries that retain the stator conductors, especially those closest to the airgap, a predefined minimum radial distance away from the rotor. Each tooth may have an elongated plinth-like geometry that terminates at a distal end with a trapezoidal head and integral rectangular tooth tip that faces the rotor core. With this architecture, the closest stator conductor is maintained a minimum separation distance away from the rotor assembly as a function of the airgap size between the stator and rotor. As a further option, the stator conductor or conductors closest to the airgap are thinner than the stator conductors farthest from the airgap. For instance, the two or four conductors closest to the rotor may have a square cross-section with a sectional area that is approximately half of that of the conductors farthest from the rotor, each of which may have a rectangular cross-section.

Attendant benefits of at least some of the disclosed concepts include stator tooth and winding conductor designs that reduce copper loss and proximity effect. For example, moving the innermost conductors away from the airgap reduces any resultant proximity effect, while engineered tapered tooth geometries help to reduce stator-flux leakage through the tooth tip and, thus, help to enhance motor torque performance. By increasing the distance between the innermost conductor layer and the rotor while reducing the size of the inner conductor layers, proposed stator slot designs improve vehicle range, fuel economy, and thermal management of electric-drive vehicles, especially at high operating speeds (e.g., 10,000 RPM and up) and during demanding drive-cycles.

Aspects of this disclosure are directed to electric machines, such as motors, generators, transformers, inductors, dynamometers, converters, etc. For instance, an electric machine includes a protective outer housing, a rotor assembly rotatably attached to the housing, and a stator assembly coaxial with and separated by an airgap from the rotor assembly. The rotor assembly includes a rotor core with one or more magnets mounted on or in the rotor core. Additionally, the stator assembly includes a stator core with multiple axially elongated, circumferentially spaced stator slots and multiple radially aligned stator teeth interleaved between and separating the slots. Numerous electromagnetic windings are wound through the stator slots. Each of these stator teeth has an elongated tooth body with a tooth head at a radial end of a tooth neck. Each tooth head has an axial cross-section with a trapezoidal crown integral with a rectangular tip.

Additional aspects of this disclosure are directed to electric-drive vehicles with multiphase brushless ACPM traction motors with features for reducing winding loss and proximity effect. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with multiple drive wheels, a passenger compartment, and other standard original equipment. An electric traction motor operates alone (e.g., for FEV applications) or in conjunction with an internal combustion engine assembly (e.g., for HEV applications) to drive one or more of the drive wheels to thereby propel the vehicle.

Continuing with the discussion of the above example, the traction motor includes a motor housing, a rotor assembly rotatably attached to the motor housing, and a stator assembly concentric with and separated by an airgap from the rotor assembly. The rotor assembly includes a cylindrical rotor core that defines therethrough multiple rotor slots, a rotor shaft attached to and projecting axially from the rotor core, and multiple permanent magnets nested inside the rotor slots of the rotor core. Likewise, the stator assembly includes a cylindrical stator core that defines therein multiple circumferentially spaced stator slots. Multiple radially aligned stator teeth separate the stator slots; electromagnetic windings are wound through each of the stator slots. Each of the stator teeth has an elongated tooth body with a tooth head at a radial end of the tooth body. Each of the tooth heads has an axial cross-section with a trapezoidal crown integral with a rectangular tip.

Aspects of this disclosure are also directed to system control logic and computer-readable media (CRM) for operating or for manufacturing any of the disclosed stator assemblies, electric machines, and/or vehicles. In an example, a method is presented for assembling an electric machine. This representative method includes, in any order and in any combination with any of the above and below disclosed options and features: receiving a housing of the electric machine; rotatably attaching a rotor assembly to the housing, the rotor assembly including a rotor core and a magnet mounted to the rotor core; and mounting a stator assembly coaxial with and separated by an airgap from the rotor assembly, the stator assembly including a stator core defining a plurality of circumferentially spaced stator slots, a plurality of radially aligned stator teeth separating the stator slots, and a plurality of electromagnetic windings located in the stator slots, each of the stator teeth having an elongated tooth body with a tooth head at a radial end of the tooth body, the tooth head having an axial cross-section with a trapezoidal crown integral with a rectangular tip.

For any of the disclosed vehicles, methods, and machines, the trapezoidal crown of each stator tooth may have an isosceles trapezium shape with a narrow edge, a wide edge parallel to and wider than the narrow edge, and a pair of angled edges oblique with and connecting the wide and narrow edges. The trapezoidal crown's narrow edge may be closest to and facing the airgap. In this instance, opposing ends of the trapezoidal crown's wide edge may have rounded corners. Likewise, opposing ends of the trapezoidal crown's narrow edge may intersect rounded corners that adjoin the rectangular tip of the stator tooth. The tooth neck and head of each stator tooth may be integrally formed with each other as a single-piece, unitary structure.

For any of the disclosed vehicles, methods, and machines, the stator core may include a hollow, cylindrical hub with the stator teeth projecting radially inward from an inner-diameter (ID) surface of the cylindrical hub. In this instance, each of the tooth bodies may include a tooth neck that attaches the tooth head to the cylindrical hub. The portion of the tooth neck immediately adjacent to and adjoining the tooth head has a neck width, whereas the trapezoidal crown may have a narrow edge with a respective width and a wide edge with a respective width that is wider than the narrow edge's width. Both the wide and narrow edge widths may be approximately equal to or wider than the neck width. As yet a further option, the rectangular tip of each tooth head may have a tip width that is wider than the neck's width, the narrow edge's width, and the wide edge's width.

For any of the disclosed vehicles, methods, and machines, a respective subset of the electromagnetic windings may be wound through each of the stator slots such that the electromagnetic winding of each subset that is closest to the rotor assembly is seated on the trapezoidal crowns of neighboring stator teeth. In this instance, the closest winding is spaced from the rotor assembly at least a minimum separation distance $D_S$; the minimum separation distance $D_S$ is equal to $(Z/A_g)$, where $A_g$ is an airgap distance of the airgap and Z is a constant of about 1.2 to about 2.0.

For any of the disclosed vehicles, methods, and machines, multiple electromagnetic windings may be wound through each stator slot to define therein a radial stack of windings. The winding of the radial winding stack that is closest to the rotor assembly may be smaller than the winding of the radial winding stack that is farthest from the rotor assembly. In this instance, the closest winding may have a respective radius/thickness that is approximately half that of a respective radius/thickness of the farthest winding. Moreover, the farthest winding may have a rectangular axial cross-section, whereas the closest winding may have a square axial cross-section. As yet another option, the closest winding may include multiple mutually parallel inner windings that are adjacent one another, and the farthest winding may include multiple mutually parallel outer windings that are adjacent one another and radially spaced from the inner windings.

The Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
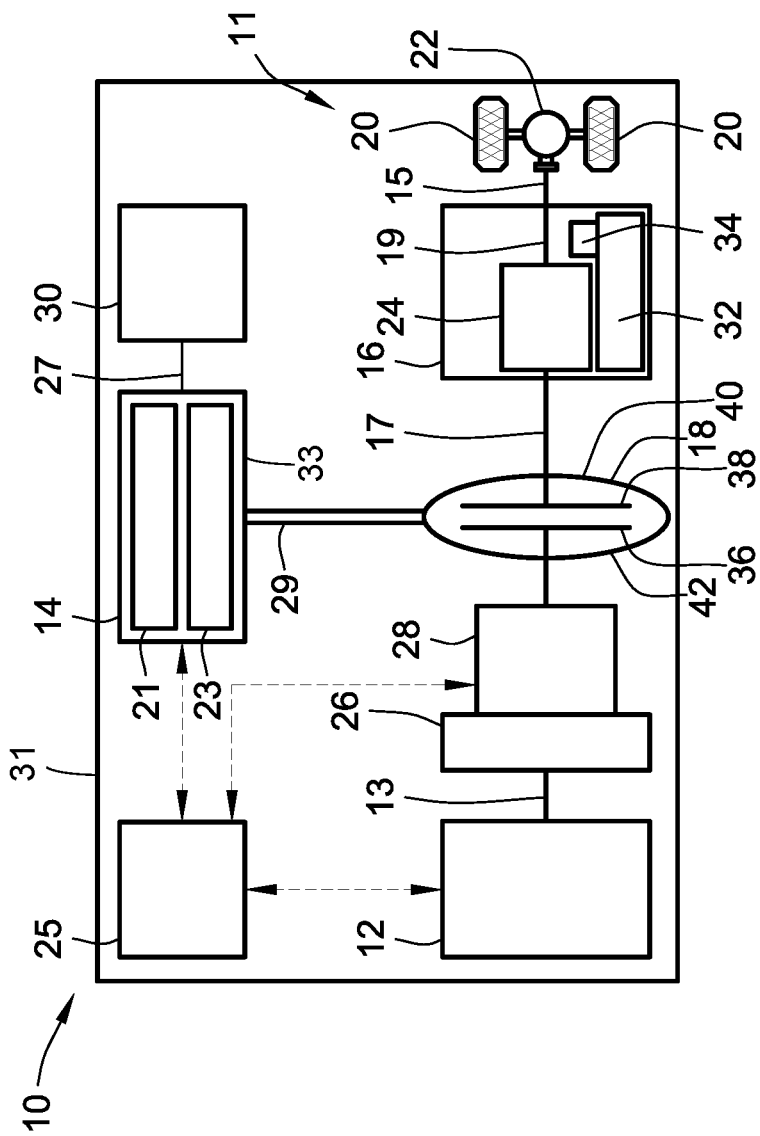
FIG. 1 is a schematic illustration of a representative electric-drive motor vehicle with a hybrid electric powertrain employing an internal combustion engine and an electric motor/generator unit (MGU) in accord with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of this disclosure may be applied to other powertrain architectures, may be incorporated into any logically relevant type of motor vehicle, and may be utilized for both automotive and non-automotive applications alike. Lastly, only select components of the motor vehicles and electric machines have been shown and will be described in additional detail herein. Nevertheless, the vehicles and devices discussed below may include numerous additional and alternative features, and other available peripheral components and hardware, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, typically by way of torque via an engine crankshaft 13, to an input side of the transmission 16. Engine torque is first transmitted via the crankshaft 13, acting as the engine's torque output member, to rotate an engine-driven torsional damper assembly 26, and concurrently transferred through the torsional damper assembly 26 to an engine disconnect device 28. This engine disconnect device 28, when operatively engaged, transmits torque received from the ICE assembly 12, by way of the damper 26, to input structure of the torque converter (TC) assembly 18. As the name implies, the engine disconnect device 28 may be selectively disengaged to drivingly disconnect the ICE 12 from the motor 14, TC assembly 18, and transmission 16.

To propel the hybrid vehicle 10 of FIG. 1, the transmission 16 is adapted to receive, selectively manipulate, and distribute tractive power output from the engine 12 and motor 14 to the vehicle's final drive system 11. The final drive system 11 is represented herein by a driveshaft 15, a rear differential 22, and a pair of rear drive wheels 20. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a rotor shaft, motor support hub, or belt (collectively motor output member 29) to the hydrodynamic torque converter 18. The torque converter 18, in turn, drivingly connects the motor 14 to an input shaft 17 of the transmission 16. The electric motor/generator unit 14 is composed of an annular stator assembly 21 circumscribing and concentric with a cylindrical rotor assembly 23. The rotor assembly 23 is rotatably attached to a motor housing 33 of the electric motor 14, which is mounted to a vehicle body 31 of the motor vehicle 10. As shown in FIG. 1, the stator assembly 21 is coaxial with and separated by an airgap from the rotor assembly 23 within the motor housing 33 (also referred to herein as "housing"). Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller or network of controllers and devices, which is represented in FIG. 1 by a programmable electronic control unit (ECU) 25.

Power transmission 16 may use differential gearing 24 to achieve selectively variable torque and speed ratios between transmission input and output shafts 17 and 19, respectively. One form of differential gearing is the epicyclic planetary gear arrangement, which offers the advantage of compactness and different torque and speed ratios among members of the planetary gearing. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as a 6-speed or 8-speed automatic transmission, the power transmission 16 may optionally take on other functionally appropriate configurations, including Continuously Variable Transmission (CVT) architectures, automated-manual transmissions, etc.

Hydrodynamic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 facing a bladed turbine 38. The impeller 36 is juxtaposed in serial power-flow fluid communication with the turbine 38, with a TC stator (not shown) interposed between the impeller 36 and turbine 38 to selectively alter fluid flow therebetween. The transfer of torque from the engine and motor output members 13, 29 to the transmission 16 via the TC assembly 18 may be through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached to an engine-side pump cover 42 such that a working hydraulic fluid chamber is formed therebetween.

Figure 2:
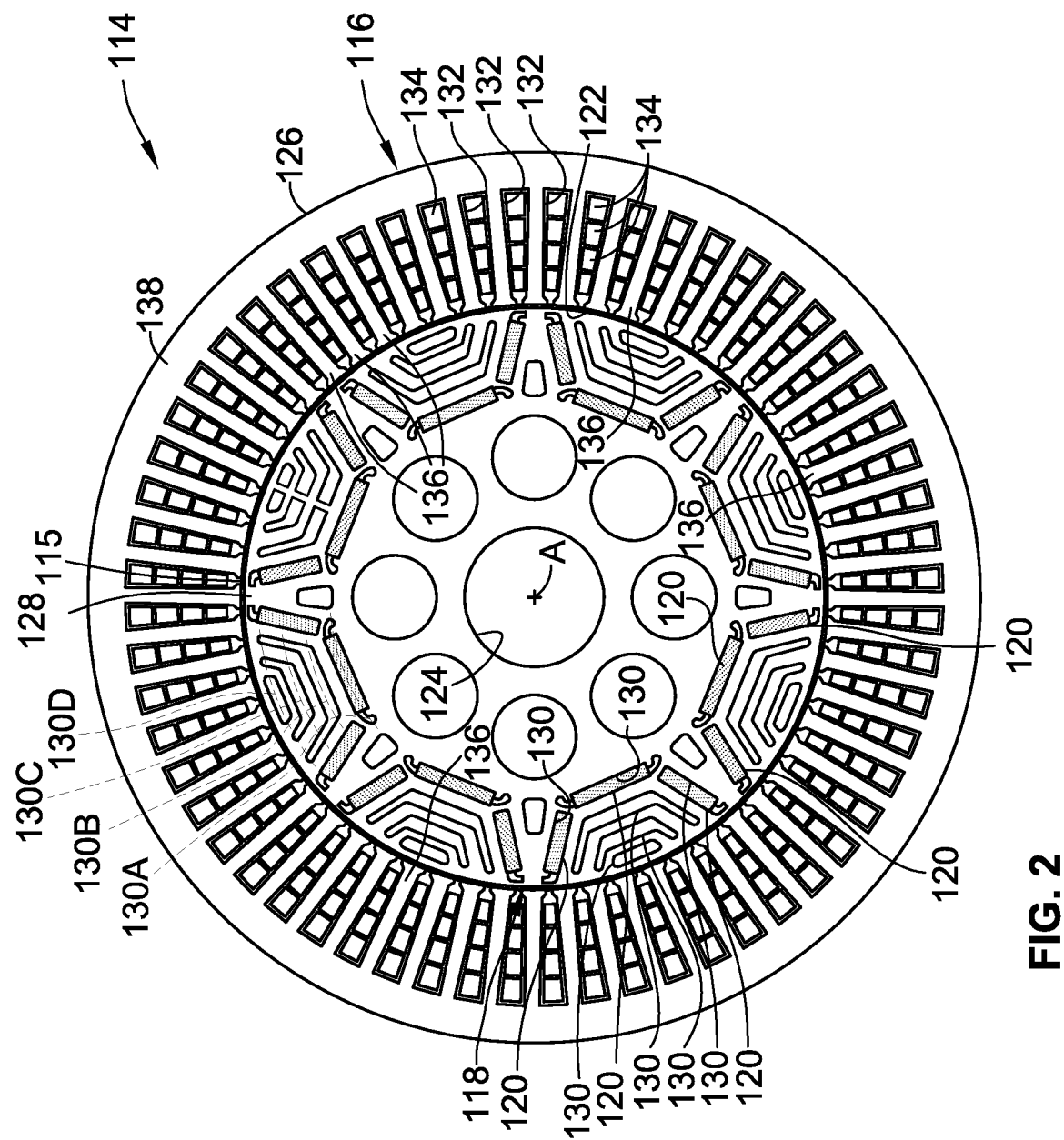
FIG. 2 is an end-view illustration of a representative alternating-current permanent magnet (ACPM) electric machine employing a hairpin-wound stator in accord with aspects of the present disclosure.

FIG. 2 illustrates an example of an electric machine 114 that employs magnetic material for exchanging electromagnetic forces with electrically conductive windings to convert electrical energy into mechanical energy, and vice versa. The electric machine 114 has a multiphase, hairpin-wound stator assembly 116 that nests therein and circumscribes a PM-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency, such as at least about 85% efficiency over a calibrated output power and speed range; a relatively high power density (e.g., greater than about 1500 watts per liter) and torque density (e.g., greater than about 5 Newton-meters per liter); a relatively wide peak power range (e.g., about 4 to 6 kilowatts or greater); a maximum speed of at least about 18,000 rpm; a reduced mass and inertia (e.g., for fast dynamic response to user output demands); and to fit into a relatively small packaging space. Innumerable alternative motor architectures may be employed by the electric machine 114 to meet similar and alternative operating parameters.

With continuing reference to FIG. 2, the stator assembly 116 is coaxial with and surrounds the rotor assembly 118 while maintaining a small airgap 115 therebetween. In accord with the illustrated example, this airgap 115 may be not less than about 0.2 millimeters (mm) and not greater than about 1.0 mm, for example, in order to maximize power output and minimize the number of permanent magnets 120 borne by the rotor assembly 118 to provide the desired power output. The representative stator and rotor assemblies 116, 118 of FIG. 2, both of which are portrayed as truncated right-circular cylinders with a generally annular shape, are concentrically aligned about a longitudinal center axis A of the electric machine 114. The stator assembly 116 has a hollow stator core 126 with a central bore 122 that nests therein the rotor assembly 118. The rotor assembly 118 has a hollow rotor core 128, e.g., that keys, splines, welds, etc., to a motor shaft (e.g., motor output member 29 of FIG. 1). It should be appreciated that a protective outer housing (shown schematically in FIG. 1) may surround an outer periphery of the stator assembly 116 and can rotatably support the rotor and rotor output shaft of the electric machine 114.

Rotor assembly 118 of FIG. 2 is fabricated with a rotor core or body 128 for supporting multiple permanent magnets 120 (twenty-four (24) PMs in the illustrated example) that are circumferentially spaced around a central bore 124. Specifically, the rotor core 128 is stamped, precision machined, and assembled with multiple rotor slots 130 arranged in radially spaced barrier layers (e.g., four distinct barrier layers). A first barrier layer 130A of slots 130 may be positioned closest to an inner periphery of the rotor core 128, while a fourth barrier layer 130D of slots 130 may be positioned furthest from the rotor body's inner periphery than the other barrier layers. A second barrier layer 130B may be radially interposed between the first and third barrier layers 130A, 130C, while a third barrier layer 130C may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as flux barriers. In other embodiments, only one or all of the barrier layers may comprise slots storing therein permanent magnets. The rotor core 128 may be fabricated from metallic disc-shaped laminates, including high-grade steel materials, that are stacked and adhered together to maintain high-speed rotational stress within predetermined limits.

Stator assembly 116 of FIG. 2 is fabricated with a stator core or body 126 that has multiple radially aligned, axially elongated, and circumferentially spaced stator slots 132 (e.g., 60 total slots in the illustrated example). Each stator slot 132 extends longitudinally through the stator core 126, parallel to the rotational axis A of the electric machine 114. The stator slots 132 house complementary legs of electrically conductive, multiphase stator windings 134. Stator windings 134—also referred to herein as "hairpin windings"—may be grouped into different sets, each of which may carry an identical number of phases of electrical current, such as three, five, six, or seven phases. In addition, the stator windings 134 may extend axially beyond the longitudinal ends of the stator core 126. A ratio of an outer diameter of the stator core 126 to an axial length of the stator core 126 may be not less than 1.5 and not greater than 3.5, for example, to satisfy packing space constraints for a desired application of the electric machine 114, such as the vehicle powertrain of FIG. 1.

For ease of manufacture and increased costs savings, it may be desirable that all of the permanent magnets 120 share an identical, rectangular polyhedron shape. Nevertheless, any one or more or all of the PM bodies may take on innumerable shapes and sizes, including other polyhedral block-type magnets, ring-shaped (annular) magnets, breadloaf block-type magnets, curved tile magnets, etc. In a non-limiting example, each permanent magnet 120 may have a thickness of about 1.5 mm to 2.5 mm to fit within a slot 130 having complementary dimensions. A total mass of magnet material used by the electric machine 114 (i.e., the mass of all magnets 120) may be about 150 grams to about 250 grams. The permanent magnets 120 of the electric machine 114 may all be fabricated from the same material, such as Neodymium Iron Boron (NdFeB); alternatively, the magnets 120 may employ different materials, such as Samarium Cobalt (SmCo), Aluminum Nickel Cobalt (AlNiCo), or any combination of rare earth magnet materials.

Similar to the permanent magnets 120 of FIG. 2, it may be desirable that all of the multiphase stator windings 134 share an identical construction, including material composition, method of manufacture, and final geometry. Each stator winding 134 may be fabricated from a unitary bar conductor, which is formed into a U-shaped geometry that is defined by a pair of hairpin legs that project from opposing ends of a hairpin crown. The hairpin's unitary bar conductor may take on a rectangular cross-section, a square cross-section, a circular cross-section, or any other suitable shape. The hairpin legs are inserted into the slots 132 of the stator core 126, with each leg extending through a different stator slot 132 such that the hairpin crown (or "end-turn") extends over several of the stator slots 132 (e.g., each crown may extend across three or more slots). These hairpin windings 134 may be inserted in a "staggered" or "interleaved" pattern with respect to adjacent hairpins. Any given stator slot 132 may include a number of hairpin legs (e.g., four in the illustrated example of FIG. 2). Once all of the hairpin stator windings 134 are inserted into the slots 132 of the stator core 126, the ends of the hairpin legs extending from a longitudinal end of the stator core 126 are bent. Electrical connections are then made to each winding 134.

During operation of the electric machine 114, e.g., in a regenerative-charging mode, the rotor assembly 118 is rotated via the rotor output shaft while the stator assembly 116 is held relatively stationary. In so doing, the permanent magnets 120 are moved past the multiphase stator windings 134; the magnetic field emitted by the permanent magnets 120 generates an electrical current in the windings 134 through electromagnetic induction. This induced electric current may be used to power a load (e.g., recharge traction battery pack 30 of FIG. 1). Conversely, during operation of the electric machine 114, e.g., in an engine-cranking mode, an EV motoring mode, or a torque-assist mode, an electric current is supplied to the stator windings 134 by a suitable power source (e.g., traction battery pack 30). Passing the supplied current through the multiphase stator windings 134 will generate a magnetic field at the stator teeth 136. The magnetic field output from the stator teeth 136 interacts with the permanent magnets 120 in the rotor assembly 118 such that the rotor core 128 and attached shaft rotate in unison to generate a rotary driving force.

Figure 3:
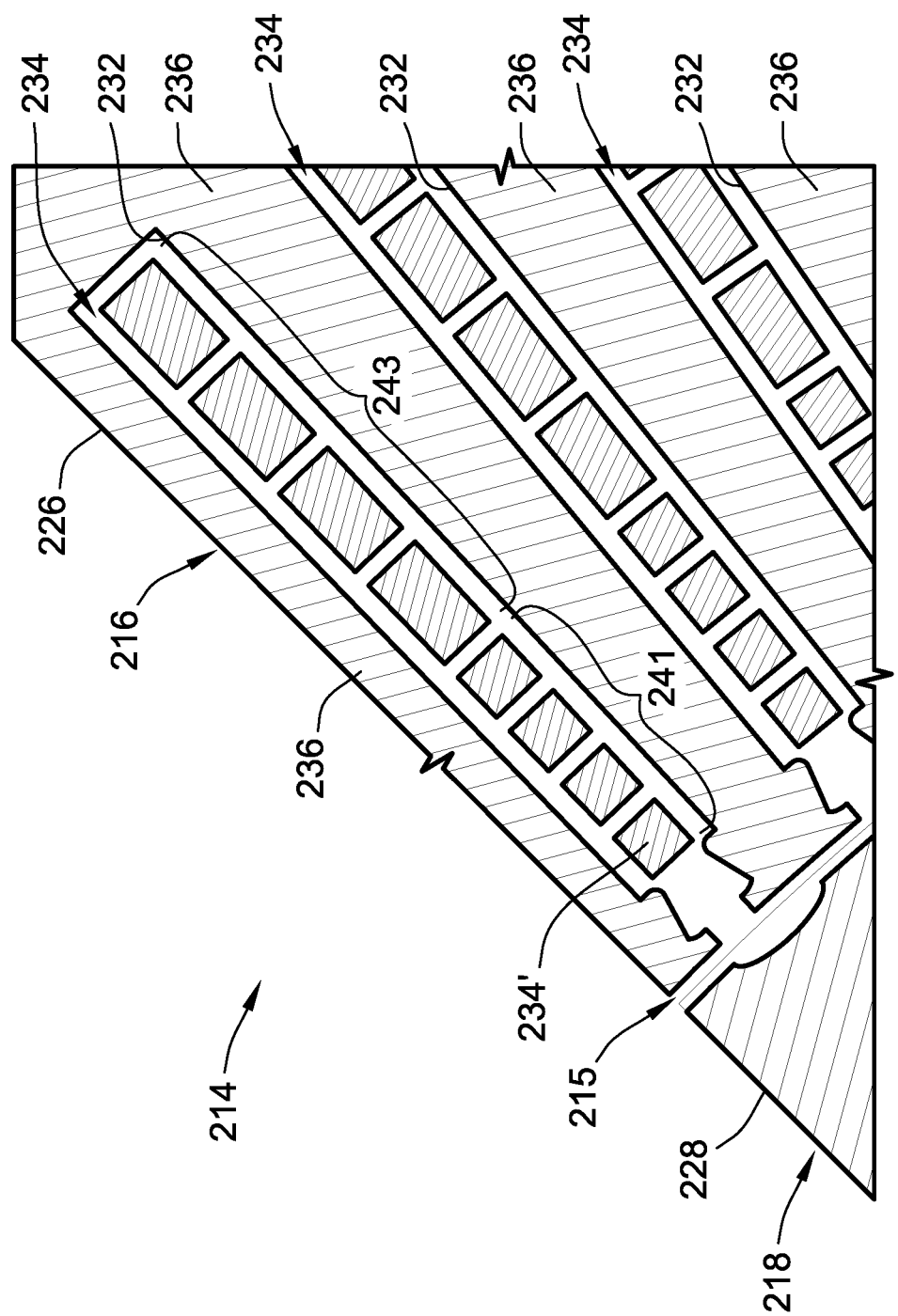
FIG. 3 is an enlarged illustration of a portion of a representative stator assembly having optimized stator tooth geometries and multi-gauge stator conductors providing reduced proximity effect and AC winding loss, e.g., for the MGU of FIG. 1 or the ACPM machine of FIG. 2, in accord with aspects of the present disclosure.
Figure 4:
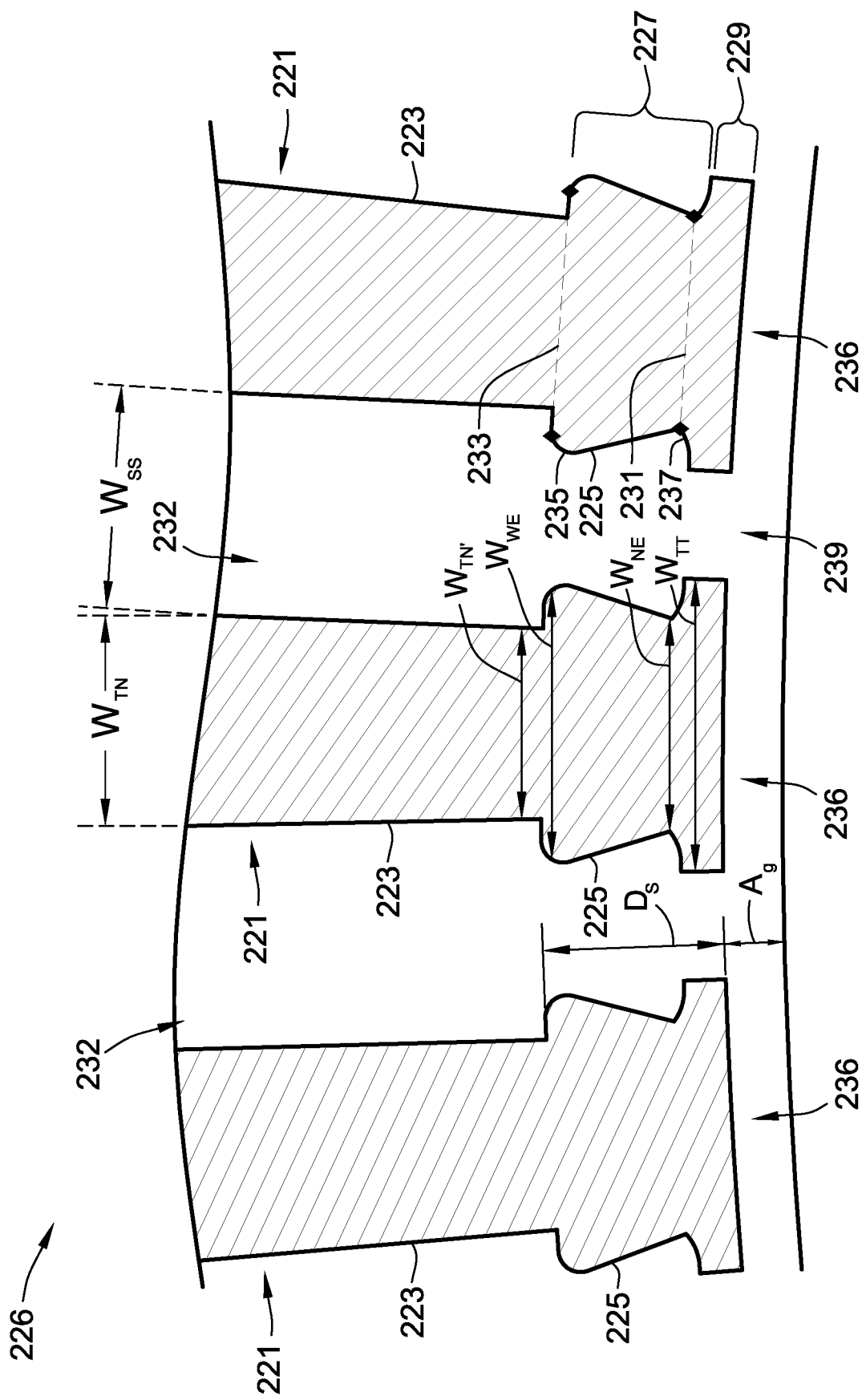
FIG. 4 is an enlarged illustration of a subset of the stator teeth of FIG. 3.

Turning next to FIGS. 3 and 4, there is shown an example of an electric machine 214 with a stator assembly 216 having optimized stator tooth geometries and variable-size conductor layers, e.g., for reduced AC winding loss and proximity effect. Although differing in appearance, it is envisioned that any of the features and options described above with reference to the traction motor/generator unit 14 of FIG. 1 and the multiphase ACPM electric machine 114 of FIG. 2 can be incorporated, singly or in any combination, into the radial-flux electric machine 214 of FIGS. 3 and 4, and vice versa. As a non-limiting point of overlap, the hairpin-wound stator assembly 216 is coaxially aligned with and separated by an airgap 215 from a magnet-bearing rotor assembly 218. Similar to the stator assembly 116 of FIG. 2, stator assembly 216 of FIG. 3 is constructed with a flux-permeable cylindrical stator core 226 having multiple circumferentially spaced stator slots 232 that are aligned radially with and extend axially through the core 226. Wound through these stator slots 232 are numerous electromagnetic conductors or windings 234, which may be in the nature of hairpin windings 134, coil windings, or other similarly suitable electrical conductors. Illustrative points of demarcation between the electric machine 214 of FIG. 3 and its corresponding counterparts in FIGS. 1 and 2, such as its tooth head, stator slot, and conductor layer designs, will be explicated in detail below.

Interleaved with and separating the stator core slots 232 are elongated stator teeth 236, which are circumferentially spaced from one another and radially aligned with respect to the stator core 226. These stator teeth 236 may project radially inward from an inner-diameter (ID) surface of a cylindrical hub portion (138 in FIG. 2) of the stator core 226, spaced equidistantly around the rotor assembly 218. For simplicity of design and ease of manufacture, it may be desirable that all of the stator teeth 236 are substantially structurally identical to one another (within acceptable manufacturing tolerances). Each flux-transmitting stator tooth 236 is formed with a tooth body 221 that is composed of a tooth neck 223 and a tooth head 225, as can best be seen in FIG. 4. An outermost radial end of the tooth neck 223 is integral with or otherwise attached to the ID-surface of the cylindrical hub, whereas an innermost radial end of the tooth neck 223 is integral with or otherwise attached to the tooth head 225. The cylindrical hub 138 is a rigid, toroidal structure that defines the main body and circumferential periphery of the stator core 226. In line with the illustrated example, the tooth neck 223, tooth head 225, and cylindrical hub are integrally formed with one another to define a single-piece, unitary structure. For laminate stator constructions, the teeth 223 are multi-piece segments of the laminate stack, whereas each laminate's neck 223, head 225, and hub portions are mutually integral.

To help minimize ohmic copper losses in the conductive windings 234 while concomitantly decreasing the AC proximity effect experienced by the windings 234 closest to the rotor assembly 218, especially at high operating speeds, the stator teeth heads 225 are engineered to minimize the stator flux leakage through the tooth tip while retaining the windings 234 farther from the airgap 215 than comparable designs (e.g., FIG. 2). According to aspects of the disclosed embodiments, the teeth heads 225 may all share a common axial cross-section—sectioned along a plane orthogonal to the rotational axis A—with a trapezoidal crown 227 portion that is integral with a rectangular tooth tip 229 portion. The trapezoidal crown 227 is shown in FIG. 4 with an isosceles trapezium shape having a narrow edge (designated by hidden line 231) that is smaller than and parallel to a wide edge (designated by hidden line 233). The wide edge 233 may define a radially outermost end of the stator tooth 236, whereas the narrow edge 231 may define a radially innermost end of the trapezoidal crown 227, which is closest to and faces the airgap 215. Opposing ends of the wide edge 233 of the trapezoidal crown 227 may terminate at filleted corners 235 (e.g., rounded with an approximately 0.2 mm radius). In the same vein, opposing ends of the narrow edge 231 may terminate at and intersect with convex rounded corners 237 that adjoin the rectangular tip 229. The rectangular tooth tips 229 may be shaped and sized to maintain a narrowed stator slot gap 239 that helps to minimize flux leakage through the gap and thereby optimize torque ripple.

To provide the stator slots 232 with a generally uniform circumferential stator slot width $W_{SS}$, the tooth neck 223 portion of each stator tooth body 221 may have a variable circumferential tooth neck width $W_{TN}$ that changes along the diametric length of the stator tooth 236. In particular, the tooth neck width $W_{TN}$ of FIG. 4 tapers and, thus, progressively decreases in size from the outermost radial end to the innermost radial end of the tooth neck 223 such that the slot width $W_{SS}$ is fixed along the diametric length of each stator slot 232. For optimized tooth geometry, the portion of the tooth neck 223 immediately adjacent to and adjoining the tooth head 225 has a neck width $W_{TN'}$ that extends in a circumferential direction with respect to the stator core 226 (e.g., from left to right in FIG. 4). The narrow edge 231 of the tooth crown 227 has a respective narrow edge width $W_{NE}$ and the wide edge 233 has a wide edge width $W_{WE}$ that is wider than the narrow edge width $W_{NE}$. Both the narrow edge and wide edge widths $W_{NE}$, $W_{WE}$ of the crown 227 may be about equal to or, as shown, wider than the neck width $W_{TN'}$. Likewise, a tooth tip width $W_{TT}$ of the crown's rectangular tip 229 may be wider than the neck width $W_{TN'}$, narrow edge width $W_{NE}$, and wide edge width $W_{WE}$.

To minimize AC proximity effect and any resultant internal resistance to current flow through the stator conductors, neighboring stator teeth 221 of the stator core 226 cooperatively retain the electromagnetic windings 234 in their respective stator slots 232, especially those closest to the airgap 215, a predefined minimum radial distance away from the rotor assembly 218. As best seen in FIG. 3, for example, each subset of electromagnetic windings 234 housed in a particular stator slot 232 has a "closest" winding 234' that is nearest to the airgap 215 and rotor assembly 218. Each of these windings 234' is seated against the trapezoidal crowns 227 of neighboring stator teeth 236, bolstered on buttressing shoulders defined by protruding segments of the wide edge 233. The closest winding 234' and, as a consequence, all of the electromagnetic windings 234 in a slot 232 are spaced from the rotor assembly 218 by at least a minimum separation distance $D_S$. This minimum separation distance $D_S$ may be calculated as $(Z/A_g)$, where $A_g$ is an airgap distance of the airgap 215 and Z is a constant of about 1.2 to about 2.0. In a non-limiting example, the airgap distance $A_g$ may be equal to about 0.60 mm to about 0.80 mm or, in a specific example, about 0.68 mm, such that the separation distance $D_S$ is equal to about 1.5 mm to about 3.3 mm or, in a specific example, at least about 2.6 mm.

With continuing reference to the radial-flux electric machine 214 presented in FIGS. 3 and 4, a respective subset of the electromagnetic windings 234 is wound through each of the stator slots 232. According to the non-limiting example of FIG. 3, the legs of eight (8) electromagnetic hairpin windings 234 are wound through each stator slot 232, arranged in a radial stack with the winding legs packaged mutually parallel with and spaced diametrically from one another. One or more of the windings 234 of the radial stack closest to the rotor assembly 218 are smaller than one or more of the windings farthest from the rotor assembly 218. Specifically, the four windings 234 closest to the rotor assembly 218 (collectively designated 241 in FIG. 3) have a first radius/thickness that is approximately half that of a second radius/thickness of the four windings 234 farthest from the rotor assembly 218 (collectively designated 243 in FIG. 3). As shown, the four farthest windings 243 each has a rectangular axial cross-section, whereas the four closest windings 241 each has a square axial cross-section. It should be appreciated that each of the stator slots 232 may contain greater or fewer than eight electromagnetic conductors 234. Moreover, the windings 234 may take on alternative cross-sectional geometries, including those noted above in the discussion of FIG. 2, may include greater or fewer than four farthest and four closest windings, and may incorporate greater than two distinct conductor sizes.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:
1. An electric machine comprising:
   a housing;
   a rotor assembly rotatably attached to the housing, the rotor assembly including a rotor core and a magnet mounted to the rotor core; and a stator assembly coaxial with and separated by an airgap from the rotor assembly, the stator assembly including a stator core defining a plurality of circumferentially spaced stator slots, a plurality of radially aligned stator teeth separating the stator slots, and a plurality of electromagnetic windings located in the stator slots, each of the stator teeth having an elongated tooth body with a tooth head at a radial end of the tooth body, the tooth head having an axial cross-section with a trapezoidal crown integral with a rectangular tip, the trapezoidal crown having an isosceles trapezium shape with a narrow edge, a wide edge parallel to and wider than the narrow edge, and a pair of angled edges oblique with and connecting the wide and narrow edges, the narrow edge of the trapezoidal crown facing the airgap.

2. The electric machine of claim 1, wherein the rectangular tip is wider than the wide and narrow edges of the trapezoidal crown.

3. The electric machine of claim 1, wherein opposing ends of the wide edge of the trapezoidal crown include rounded corners.

4. The electric machine of claim 1, wherein opposing ends of the narrow edge of the trapezoidal crown intersect rounded corners that adjoin the rectangular tip.

5. The electric machine of claim 1, wherein the stator core includes a cylindrical hub, the stator teeth projecting radially inward from an inner-diameter surface of the cylindrical hub, each of the tooth bodies including a tooth neck attaching the tooth head to the cylindrical hub.

6. The electric machine of claim 5, wherein a portion of the tooth neck adjoining the tooth head has a neck width, and wherein the narrow edge and the wide edge of the trapezoidal crown have a narrow edge width and a wide edge width, respectively, both wider than the neck width.

7. The electric machine of claim 6, wherein the rectangular tip has a tip width wider than the neck width, the narrow edge width, and the wide edge width.

8. The electric machine of claim 1, wherein a respective subset of the electromagnetic windings is wound through each of the stator slots, and wherein a closest winding of the subset of the electromagnetic windings closest to the rotor assembly is seated on the trapezoidal crowns of neighboring ones of the stator teeth.

9. The electric machine of claim 8, wherein the closest winding is spaced from the rotor assembly at least a minimum separation distance $D_S$, and wherein the minimum separation distance $D_S=(Z/A_g)$, where $A_g$ is an airgap distance of the airgap and Z is a constant of about 1.2 to about 2.0.

10. The electric machine of claim 1, wherein multiple ones of the electromagnetic windings are wound through each of the stator slots to define therein a radial stack of windings, and wherein a closest winding of the radial stack of windings closest to the rotor assembly is smaller than a farthest winding of the radial stack of windings farthest from the rotor assembly.

11. The electric machine of claim 10, wherein the closest winding has a first radius or thickness approximately half that of a second radius or thickness of the farthest winding.

12. The electric machine of claim 11, wherein the farthest winding has a rectangular axial cross-section and the closest winding has a square axial cross-section.

13. The electric machine of claim 11, wherein the closest winding includes multiple mutually parallel inner windings adjacent one another, and wherein the farthest winding includes multiple mutually parallel outer windings adjacent one another and radially spaced from the inner windings.

14. The electric machine of claim 1, wherein each of the stator teeth includes a tooth neck integrally formed with the tooth head as a single-piece structure.

15. A motor vehicle, comprising:
a vehicle body;
multiple drive wheels mounted to the vehicle body; and
a traction motor mounted to the vehicle body and operable to drive one or more of the drive wheels to thereby propel the motor vehicle, the traction motor including:
a motor housing;
a rotor assembly rotatably attached to the motor housing, the rotor assembly including a cylindrical rotor core defining a plurality of rotor slots, a rotor shaft attached to and projecting axially from the rotor core, and a plurality of permanent magnets nested inside the rotor slots of the rotor core; and
a stator assembly concentric with and separated by an airgap from the rotor assembly, the stator assembly including a cylindrical stator core defining therein a plurality of circumferentially spaced stator slots, a plurality of radially aligned stator teeth separating the stator slots, and a plurality of electromagnetic windings wound through each of the stator slots, each of the stator teeth having an elongated tooth body with a tooth head at a radial end of the tooth body, the tooth head having an axial cross-section with a trapezoidal crown integral with a rectangular tip, the trapezoidal crown having an isosceles trapezium shape with a narrow edge parallel to a wide edge, the narrow edge facing the airgap.

16. A method of assembling an electric machine, the method comprising:
receiving a housing of the electric machine;
rotatably attaching a rotor assembly to the housing, the rotor assembly including a rotor core and a magnet mounted to the rotor core; and
mounting a stator assembly coaxial with and separated by an airgap from the rotor assembly, the stator assembly including a stator core defining a plurality of circumferentially spaced stator slots, a plurality of radially aligned stator teeth separating the stator slots, and a plurality of electromagnetic windings located in the stator slots, each of the stator teeth having an elongated tooth body with a tooth head at a radial end of the tooth body, the tooth head having an axial cross-section with a trapezoidal crown integral with a rectangular tip, the trapezoidal crown having an isosceles trapezium shape with a narrow edge parallel to a wide edge, the narrow edge facing the airgap.

17. The method of claim 16, wherein the rectangular tip is wider than the wide edge and the narrow edge of the trapezoidal crown.

18. The method of claim 16, wherein the stator core includes a cylindrical hub, the stator teeth projecting radially inward from the cylindrical hub, each of the tooth bodies including a tooth neck attaching the tooth head to the cylindrical hub, and wherein a portion of the tooth neck adjoining the tooth head has a neck width, the narrow edge and the wide edge having a narrow edge width and a wide edge width, respectively, both wider than the neck width.

19. The method of claim 16, wherein a respective subset of the electromagnetic windings is wound through each of the stator slots, a closest winding of the subset of windings closest to the rotor assembly is seated on the trapezoidal crowns of neighboring ones of the stator teeth, and wherein the closest winding is at least a minimum separation distance $D_S$ away from the rotor assembly, and wherein the minimum separation distance $D_S=(Z/A_g)$, where $A_g$ is an airgap distance of the airgap and Z is a constant of about 1.2 to 2.0.

20. The method of claim 16, wherein multiple ones of the electromagnetic windings are wound through each of the stator slots to define therein a radial stack of windings, and wherein a closest winding of the radial stack of windings closest to the rotor assembly is smaller than a farthest winding of the radial stack of windings farthest from the rotor assembly.

* * * * *